(12) United States Patent
Iwatsuki et al.

(10) Patent No.: US 6,371,550 B2
(45) Date of Patent: Apr. 16, 2002

(54) STRUCTURE FOR HOLDING VISOR FOR DOOR MIRROR DEVICE

(75) Inventors: Masakazu Iwatsuki, Konan; Yasuhide Narita, Nagoya; Bunji Inagaki, Kasugai, all of (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/827,240

(22) Filed: Apr. 6, 2001

(30) Foreign Application Priority Data

Apr. 14, 2000 (JP) ........................................ 2000-113678

(51) Int. Cl.[7] ................................................ B60J 10/00
(52) U.S. Cl. ..................................... 296/152; 248/475.1
(58) Field of Search .......................... 296/152; 248/466, 248/475.1

(56) References Cited

U.S. PATENT DOCUMENTS

| | | | | |
|---|---|---|---|---|
| 3,188,913 A | * | 6/1965 | O'Shea ..................... | 248/475.1 |
| 4,930,742 A | * | 6/1990 | Schofield et al. ......... | 248/475.1 |
| 5,268,795 A | * | 12/1993 | Usami ................. | 248/475.1 X |
| 6,089,523 A | * | 7/2000 | Brow et al. ............... | 248/475.1 |
| 6,213,537 B1 | * | 4/2001 | Butz et al. ................... | 296/152 |
| 6,244,558 B1 | * | 6/2001 | Castle ................. | 248/475.1 X |

* cited by examiner

*Primary Examiner*—Stephen T. Gordon
*Assistant Examiner*—Lori L Coletta
(74) *Attorney, Agent, or Firm*—Nixon Peabody LLP; Thomas W. Cole (57) ABSTRACT

The present invention relates to a structure for holding a visor for a door mirror device. In the present invention, a seat is integrally formed at a backside of a visor cover. A clip, which is formed separately from the visor cover, is mounted to the seat. A clip-engaging hole is formed at a frame, and, by engaging the clip with the clip engaging hole, the visor cover can be assembled to the frame.

18 Claims, 9 Drawing Sheets

STRUCTURE FOR HOLDING VISOR FOR DOOR MIRROR DEVICE

BACKGROUND OF THE INVENTION

1. Field of the Invention

The present invention relates to a structure for holding a visor for a door mirror device which holds one or both of a resin visor cover and a resin visor rim that form an outer casing of the door mirror device.

2. Description of the Related Art

Figure 8:
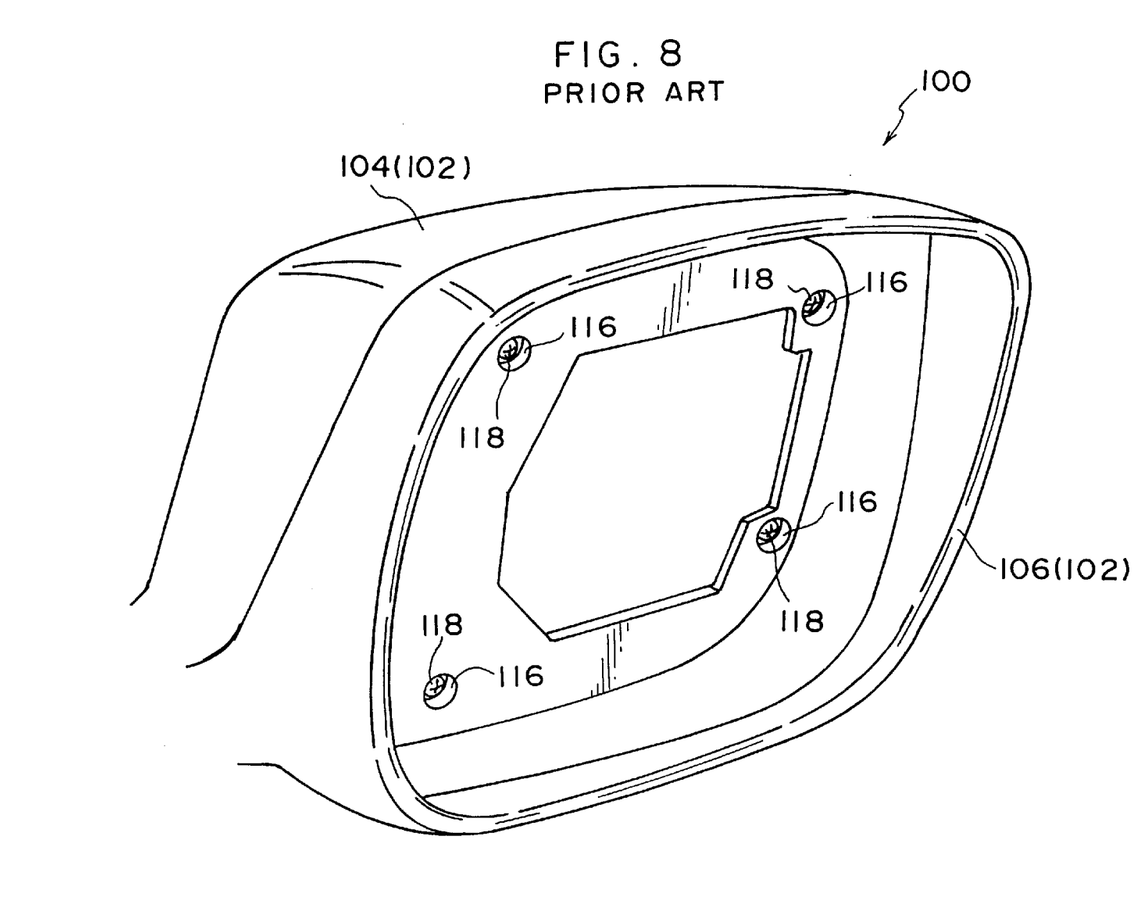
FIG. 8 is a schematic perspective view of a conventional door mirror device.

A conventional door mirror device 100 for confirming the rear field of vision is illustrated in FIG. 8 in a schematic perspective view. As shown in FIG. 8, an outer casing of the door mirror device 100 is formed by a door mirror visor 102. The door mirror visor 102 comprises a visor cover 104, which forms a front outer casing of the device, and a visor rim 106, which forms a rear outer casing of the device. Accordingly, the door mirror visor 102 formed by two components is used in the door mirror device 100.

Figure 9:
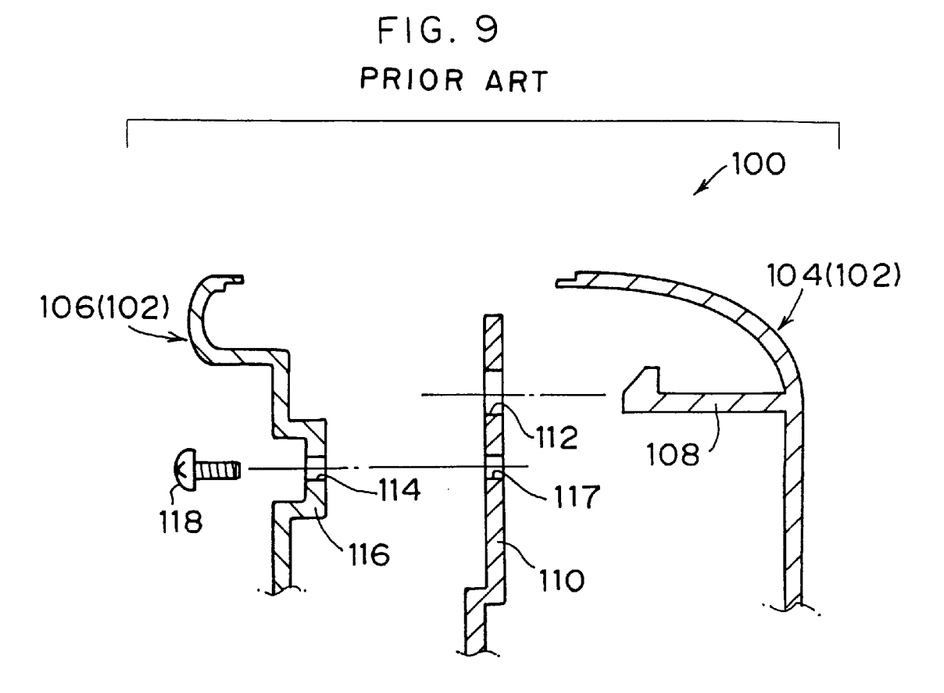
FIG. 9 is a longitudinal sectional view showing a structure for holding a visor cover for the door mirror device employed in the door mirror device illustrated in FIG. 8.

In assembling the door mirror device 100, the following method has mainly been employed. That is, as shown in FIG. 9, a resin claw 108 is integrally formed at the backside of the visor cover 104 and a claw-engaging hole 112 is formed at a frame 110 (or at the visor rim 106) disposed between the visor cover 104 and the visor rim 106. A mounting seat 116 with a screw insertion hole 114 formed at a central portion thereof is formed integrally with the visor rim 106. A screw insertion hole 117 is also formed at the frame 110. The visor rim 106 is first fixed to the frame 110 by a screw 118, then the resin claw 108 of the visor cover 104 is elastically engaged with the claw-engaging hole 112 of the frame 110.

However, when a low-cost resin material is used in the aforementioned structure, because the resin claw 108 is formed integrally at the time the visor cover 104 is formed, there is the possibility that the resin claw 108 may be deformed by, for example, the effect of heat or deterioration of the resin material due to age, so that the holding power of the visor cover 104 is lowered. Furthermore, when the holding power of the visor cover 104 is lowered, there is also the potential for chattering to arise between the frame 110 and the visor cover 104 and visor rim 106. In order to prevent heat and deterioration due to age from effecting the resin claw 108, considerable man hours and costs must be expended for dimensional tuning and maintenance of the product.

SUMMARY OF THE INVENTION

In view of the aforementioned facts, it is an object of the present invention to provide a structure for holding a visor for a door mirror device with which sufficient holding power can be obtained over a long period of time.

A first aspect of the present invention is a structure for holding a visor for a door mirror device, the structure including a resin visor cover that forms a front outer casing of the device and a resin visor cover that forms a rear outer casing of the device and connects to the visor cover, and for holding at least one of the visor cover and the visor rim, the structure comprising: a seat provided at an inner side of at least one of the visor cover and the visor rim; and a clip that is formed separately from the seat, is mounted to the seat, and elastically engages with one of the visor cover, the visor rim, and a frame disposed between the visor cover and the visor rim.

In a case in which the seat is provided at the visor cover, since the seat is provided at an inner side of the resin visor cover which forms the front outer casing of the device, a clip which is formed as a separate part is first mounted to the seat. Then, the clip is elastically engaged with the resin visor rim which forms the rear outer casing of the device or with the frame which is disposed between the visor rim and the visor cover. The visor cover is held in this manner.

In the present invention, since the clip with which the visor cover is assembled to the visor rim or to the frame is formed as a separate part, a material can be selected arbitrarily for the clip. That is, by selecting materials which are hardly effected by heat or deterioration due to age, deformation of the clip can be prevented.

In the structure for holding a visor for a door mirror device in accordance with the present invention, it is preferable that the seat has a top wall in which a clip-engaging hole and an assembly notch that communicates with the clip-engaging hole are formed; and the clip has a pair of plates that nip the top wall in a state in which the clip is mounted in the clip-engaging hole.

The present invention is also characterized in that the seat has a hollow, substantially cubic configuration and is structured by side walls that together form a substantially U-shaped configuration when seen in planar cross section and the top wall that joins the upper ends of the side walls.

Furthermore, in the structure for holding a visor for a door mirror device in accordance with the present invention, it is preferable that a distance between the pair of plates of the clip is set to be substantially equal a thickness of the top wall of the seat, and that the clip has a mounting portion that connects the pair of plates at a center of the plates.

The present invention is also characterized in that the mounting portion has an outer diameter substantially corresponding with an inner diameter of the clip-engaging hole formed in the top wall.

In the structure for holding a visor for a door mirror device of the present invention, it is preferable that the clip further comprises an elastically deformable claw having a substantially T-shaped configuration when seen in side view, and that the clip is formed by a material having excellent heat resistance and resistance to cracks caused by impregnation of a solvent. The present invention further characterized in that the claw of the clip may be elastically-contracted only in a fixed direction.

An assembling notch is formed at the top wall of the seat. A mounting portion disposed between the pair of plates of the clip is inserted toward the assembling notch. Then, the clip is pressed so as to be mounted to the clip-engaging hole that communicates with the assembling notch. In the manner, the clip is assembled to the seat in a state in which the top wall is nipped between the pair of plates of the clip.

In the structure for holding a visor for a door mirror device in accordance with the present invention, it is preferable that a restricting portion that serves as a rotation-preventing function to the clip when the clip is mounted on the seat is provided on at least one of the seat and the clip.

Since restricting portions that prevent the clip, which is mounted to the seat, from rotating are provided to at least one of the seat and the clip, rotation of the clip when the visor cover is assembled to the visor rim or to the frame can be prevented.

In the structure for holding a visor for a door mirror device in accordance with the present invention, it is preferable that a restricting portion that serves as a rotation-preventing function to the clip is provided at the top wall of the seat, with the restricting portion abutting sides of the plate that makes contact with an upper surface of the top wall in a state in which the clip is mounted in the clip-engaging hole.

When the clip is mounted to the seat, the restricting portions provided on the upper surface of the top wall of the seat abut both sides of a plate (the plate which abuts the upper surface of the top wall). Therefore, the clip is prevented from rotating. Consequently, rotation of the clip when the visor cover is assembled to the visor rim or to the frame can be prevented. Further, in the present invention, since the restricting portions are provided at the upper surface of the top wall of the seat, neither is it necessary to form undercuts at the part of the seat in the mold of the visor cover, nor is it necessary to give special consideration to removal of the mold.

Further, in the present invention, since the restricting portions are provided at the upper surface of the top wall of the seat, neither is it necessary to form undercuts in the mold of the visor cover, nor is it necessary to give special consideration to removal of the mold.

In the structure for holding a visor for a door mirror device in accordance with the present invention, it is preferable that a stopper for preventing the clip from becoming dismounted from the seat is provided at each side of the assembly notch in the top wall of the seat.

The present invention is further characterized in that the restricting portion is a pair of ribs formed parallel to each other at sides of the upper surface of the top wall, and that a distance between opposing inner surfaces of the pair of ribs is substantially equal to a transverse direction dimension of the upper plate of the clip.

The present invention is still further characterized in that a cross section of the stopper has a substantially trapezoidal configuration and the stopper has a tapered surface to serve as a guide when the clip is mounted to the seat.

Since the stoppers, which prevent the clip from becoming dismounted from the seat, are provided at each sides of the assembling notch of the top wall of the seat, inadvertent dismounting of the clip from the seat can be prevented after the clip is mounted to the seat. Thus, it is unnecessary to remount the clip to the seat at the time of assembling the visor cover to the visor rim or the frame after mounting the clip to the seat.

DESCRIPTION OF THE PREFERRED EMBODIMENTS

Embodiments of the present invention will be described in detail hereinafter. The embodiments of the present invention include first and second embodiments. The first embodiment will be described first, and then the second embodiment will be described.

Figure 1:
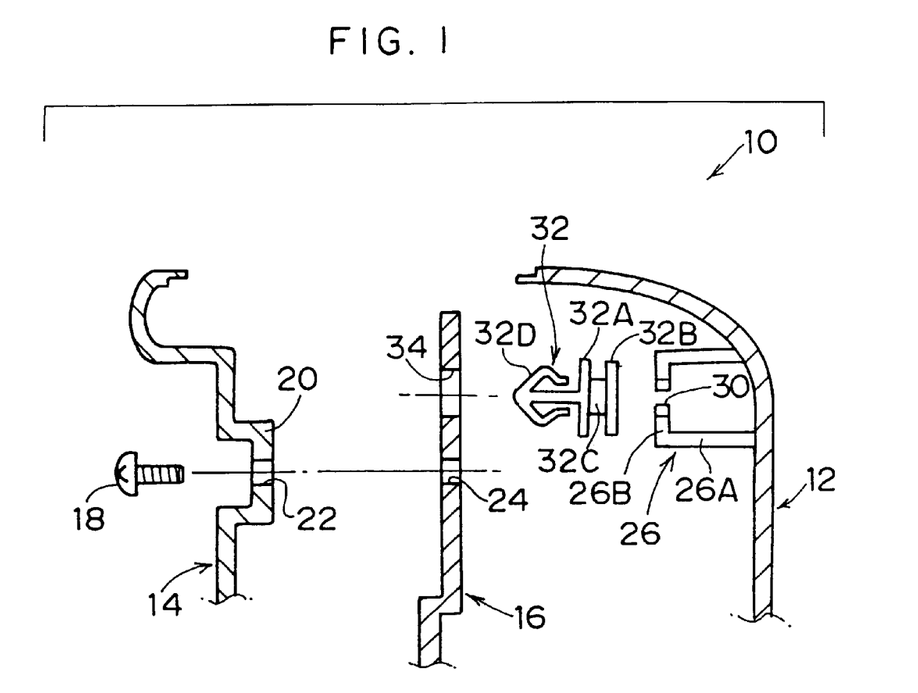
FIG. 1 is an exploded longitudinal sectional view of main portions, i.e., a structure for holding a visor cover, of a door mirror device relating to a first embodiment of the present invention.
Figure 2:
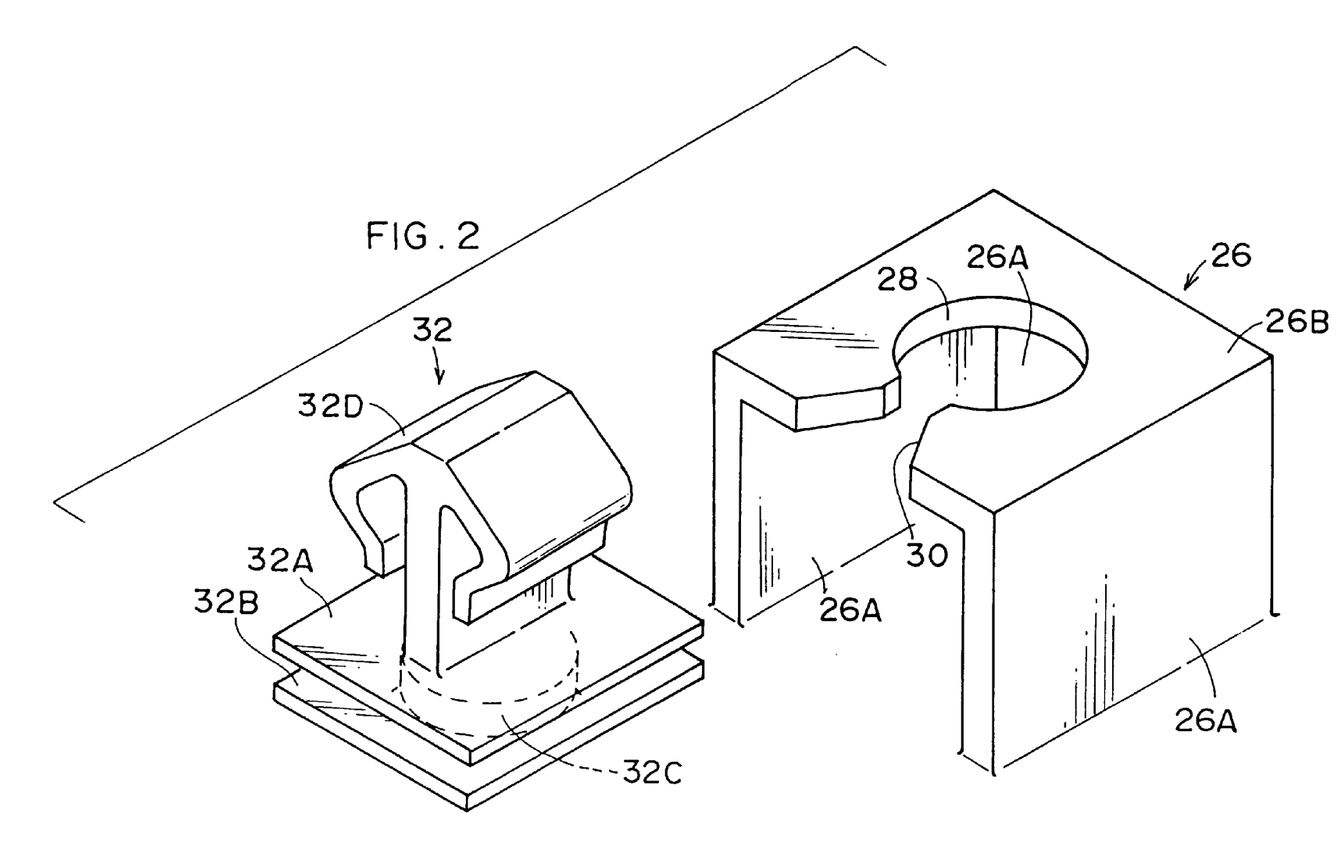
FIG. 2 is an enlarged perspective view illustrating a clip and a seat, which are main portions of the first embodiment of the present invention, in a state in which the clip and the seat have been separated.
Figure 3:
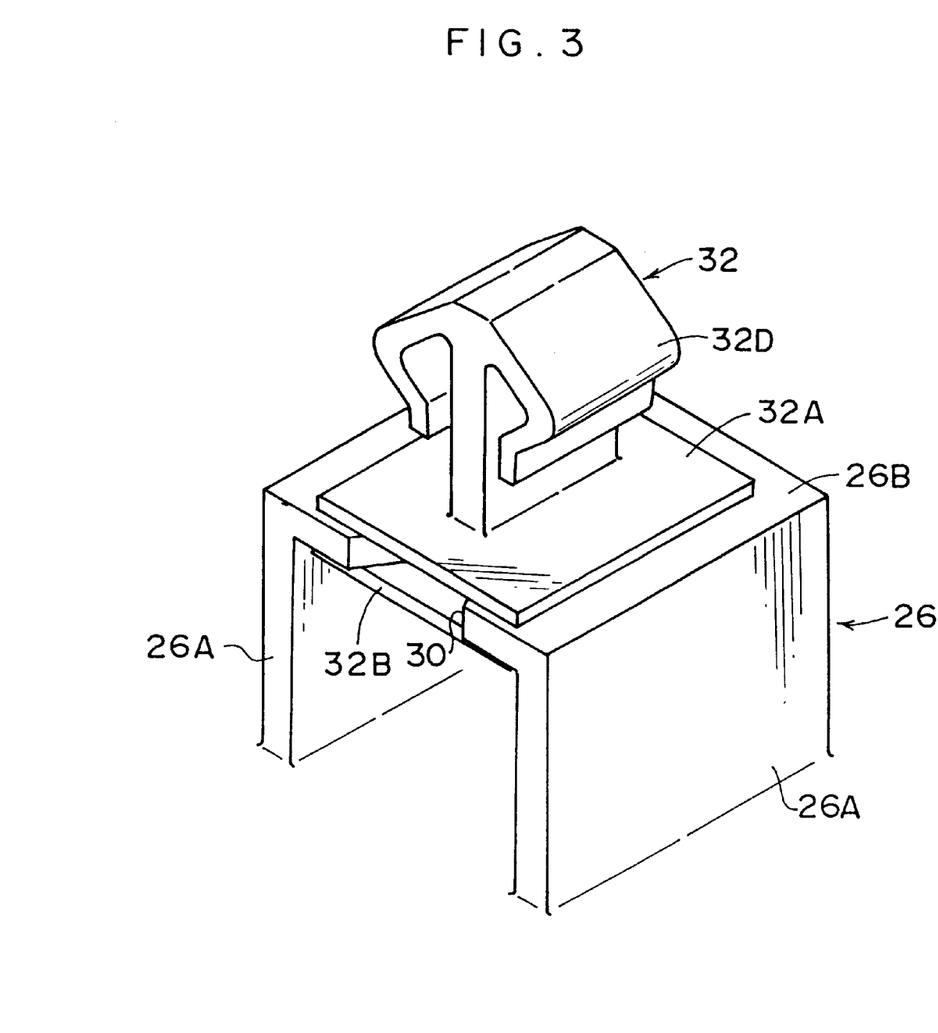
FIG. 3 is an enlarged perspective view illustrating a state in which the clip has been mounted on the seat illustrated in FIG. 2.

Referring now to FIGS. 1 through 3, an electrically retractable door mirror device 10 relating to a first embodiment of the present invention will be described. Only main portions of the present invention will be described here, since the peripheral structure of the door mirror device 10 will be discussed in detail in a later-described second embodiment.

FIG. 1 is an exploded longitudinal sectional view of main portions of a door mirror device 10 relating to the present embodiment. As shown in FIG. 1, the door mirror device 10 comprises a visor cover 12, a visor rim 14, and a frame 16 which is disposed between the visor cover 12 and the visor rim 14. The visor cover 12 is formed in a substantial box-shape and forms a front outer casing of the device 10. The visor rim 14 is formed in a substantial frame-shape and is fitted in an open end portion of the visor cover 12 so as to form a rear outer casing of the device 10.

Each of the visor cover 12 and the visor rim 14 corresponds to the visor for a door mirror device according to the present invention.

The visor cover 12 and the visor rim 14 are made of resin and the frame 16 is made of metal. The resin materials that form the visor cover 12 and the visor rim 14 are often selected from an ABS (an amorphous thermoplastic resin composed of acrylonitrile, butadiene, and styrene) and a compound of ABS and PC (polycarbonate) in view of reduced manufacturing cost.

The visor cover 12, the visor rim 14, and the frame 16 are assembled in the following way.

The visor rim 14 is fixed to the frame 16 with a screw 18. Specifically, a substantially cylindrical mounting seat 20 having a base is formed integrally with the visor rim 14 at a predetermined position thereof. A screw insertion hole 22 is formed in the center of the base of the mounting seat 20. Correspondingly, a screw insertion hole 24 is formed at the frame 16 so as to be coaxial with the screw insertion hole 22. The screw 18 is screwed from the backside of the visor rim 14 into the insertion hole 22 of the mounting sea 20, then into the insertion hole 24 of the frame 16, thereby fixing the visor rim 14 to the frame 16.

The visor cover 12 is mounted to the frame 16 at the end of the process of assembling the door mirror device 10. Specifically, as shown in expanded views in FIGS. 2 and 3, a hollow seat 26 having a substantially cubic configuration is integrally formed at a predetermined position on an inner surface of (a back side surface of) the visor cover 12. The seat 26 is structured by side walls 26A that together form a substantially U-shaped configuration when seen in planar cross section, and a top wall 26B that joins the upper ends of the side walls 26A.

A circular clip-engaging hole 28 having a diameter of predetermined dimension is formed in the center of the top wall 26B. A tapered assembly notch 30 that communicates with the clip-engaging hole 28 is also formed in the top wall 26B at the side of the top wall 26B that does not join with the upper ends of the side walls 26A.

A resin clip 32 is mounted on the seat 26 having the structure described above. The clip 32 comprises a pair of plates 32A and 32B, a mounting portion 32C, and a claw 32D. The plates 32A and 32B are disposed parallel to one another and are formed in substantially rectangular, planar shapes. The cylindrical mounting portion 32C is interposed between the plates 32A and 32B and connects the plates 32A and 32B at a central portion of the plates. The claw 32D is vertically disposed with respect to a central portion of the upper plate 32A, has a substantial T-shape when seen in side view, and is elastically deformable.

The distance between the plates 32A and 32B (i.e., the height of the mounting portion 32C) is set to be substantially equal to the thickness of the top wall 26B of the seat 26. The outer diameter of the mounting portion 32C corresponds with the inner diameter of the clip-engaging hole 28 formed in the top wall 26B.

It should be noted that a material having excellent heat resistance and resistance to cracks resulting from ESC (impregnation of solvents such as wax), such as POM (polyacetal) or PP (polypropylene), is used for the resin material forming the clip 32 described above.

As shown in FIG. 1, a clip-engaging hole 34, in which the claw 32D of the clip 32 is elastically anchored, is formed at a predetermined position of the frame 16, which position opposes the clip 32 in a state in which the clip 32 is mounted to the seat 26. The clip-engaging hole 34 has a substantially rectangular shape.

The assembly process will be described hereinafter. First, an unillustrated driving section is set to the frame 16. The screw 18 is then screwed in the screw insertion holes 22 and 24 to fix the visor rim 14 to the frame 16. The clip 32 is mounted at the seat 26 of the visor cover 12. Specifically, the mounting portion 32C disposed between the pair of plates 32A and 32B of the clip 32 is inserted toward the assembly notch 30 formed in the top wall 26B of the seat 26. Then, the clip 32 is pressed so that the mounting portion 32C is inserted in the clip-engaging hole 28 that communicates with the assembly notch 30. In this manner, the clip 32 is assembled to the top wall 26B of the seat 26 in a state in which the top wall 26B is nipped between the pair of plates 32A and 32B. Thereafter, the claw 32D of the clip 32 is inserted in the clip-engaging hole 34 formed in the frame 16 so that the claw 32D engages with the frame 16 while being elastically deformed in a direction in which it is caused to become narrower. In this manner, the visor cover 12 is held by the frame 16 in a state in which the visor cover 12 is fitted in the visor rim 14.

As described above, in the present embodiment, since the clip 32 for mounting the visor cover 12 to the frame 16 is formed as a separate part, resin material for the clip 32 can be optionally selected. That is, as mentioned before, the visor cover 12 itself can be made of ABS, a compound of ABS and PC, or the like in view of reduced manufacturing cost, and the clip 32 can be made of a resin material (such as POM, PP, or the like) that has properties demanded of the clip 32 (excellent heat resistance and resistance to cracks resulting from ESC), so that deformation can be suppressed.

As a result, according to the present invention, the holding power of the visor cover 12 can be maintained over a long period of time.

Further, because the holding power of the visor cover 12 can be maintained over a long period of time, chattering of the visor cover 12 following assembly can be prevented, and separation of the visor cover 12 from the frame 16 can therefore be prevented. Moreover, in the case of conventional structures in which the resin claw is integrally formed with the visor cover, it has been necessary to expend considerable man hours and costs on dimensional tuning and dimensional management of the product in order to prevent misalignment of the position at which the resin claw engages with the engaging hole formed in the frame or the visor rim, with the misalignment resulting in the resin claw-engaging with the engaging hole in a somewhat bent state. According to the present invention, however, such drawbacks are all eliminated.

In addition, in the present embodiment, the top wall 26B of the seat 26 is nipped by the pair of plates 32A and 32B in a state in which the clip 32 is mounted to the top wall 26B of the seat 26. As a result, according to the present invention, the state in which the clip 32 is mounted to the seat 26 can be stabilized, and chattering of the clip 32 in the longitudinal direction with respect to the seat 26 can be prevented.

Referring to FIGS. 4 through 7, an electrically retractable door mirror device 10 relating to a second embodiment of the present invention will next be described. Components of the present embodiment which are similar to those of the first embodiment are designated by the same reference numerals, and detailed description thereof will be omitted.

Figure 4:
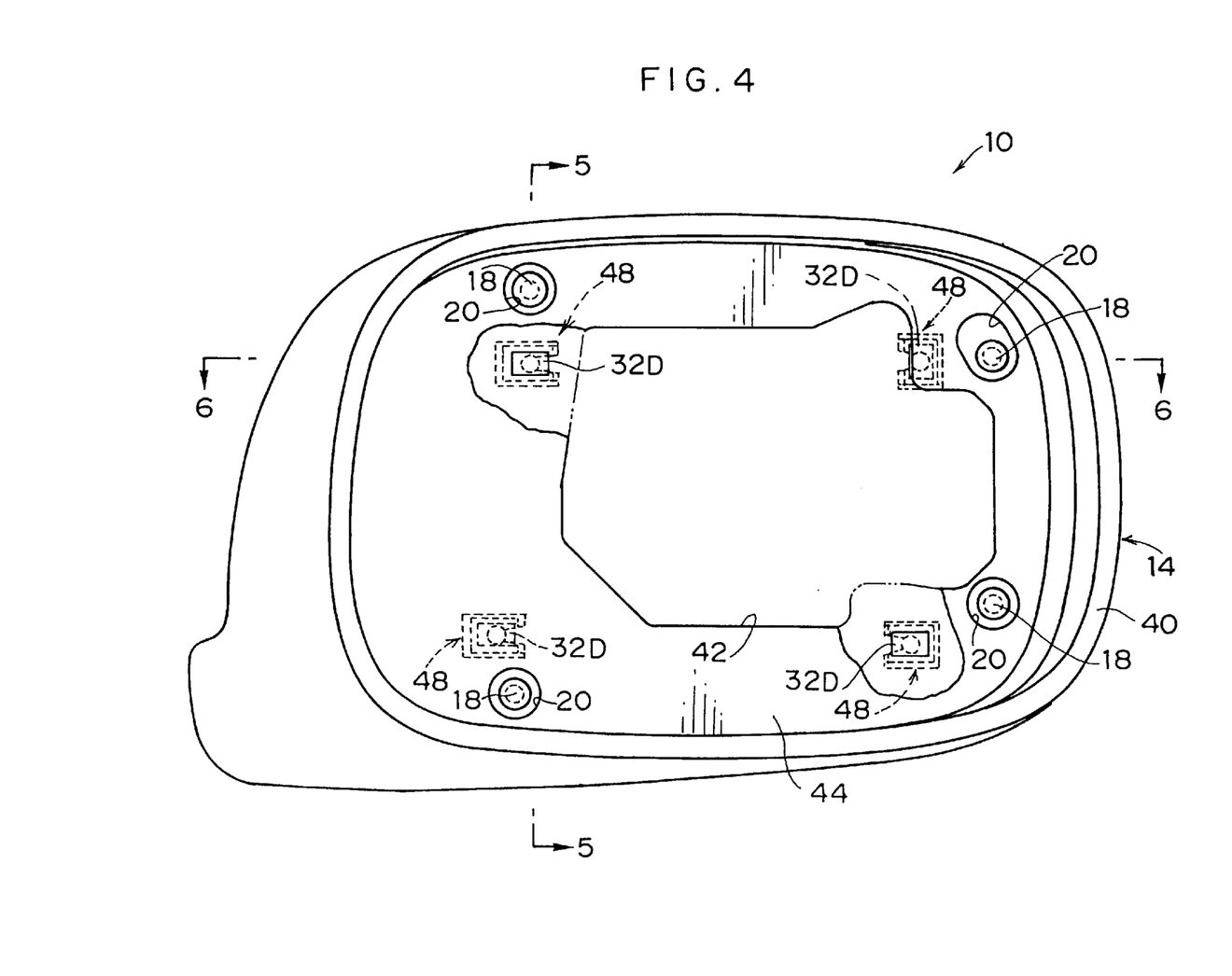
FIG. 4 is a front view of an overall structure of a door mirror device relating to a second embodiment of the present invention.
Figure 5:
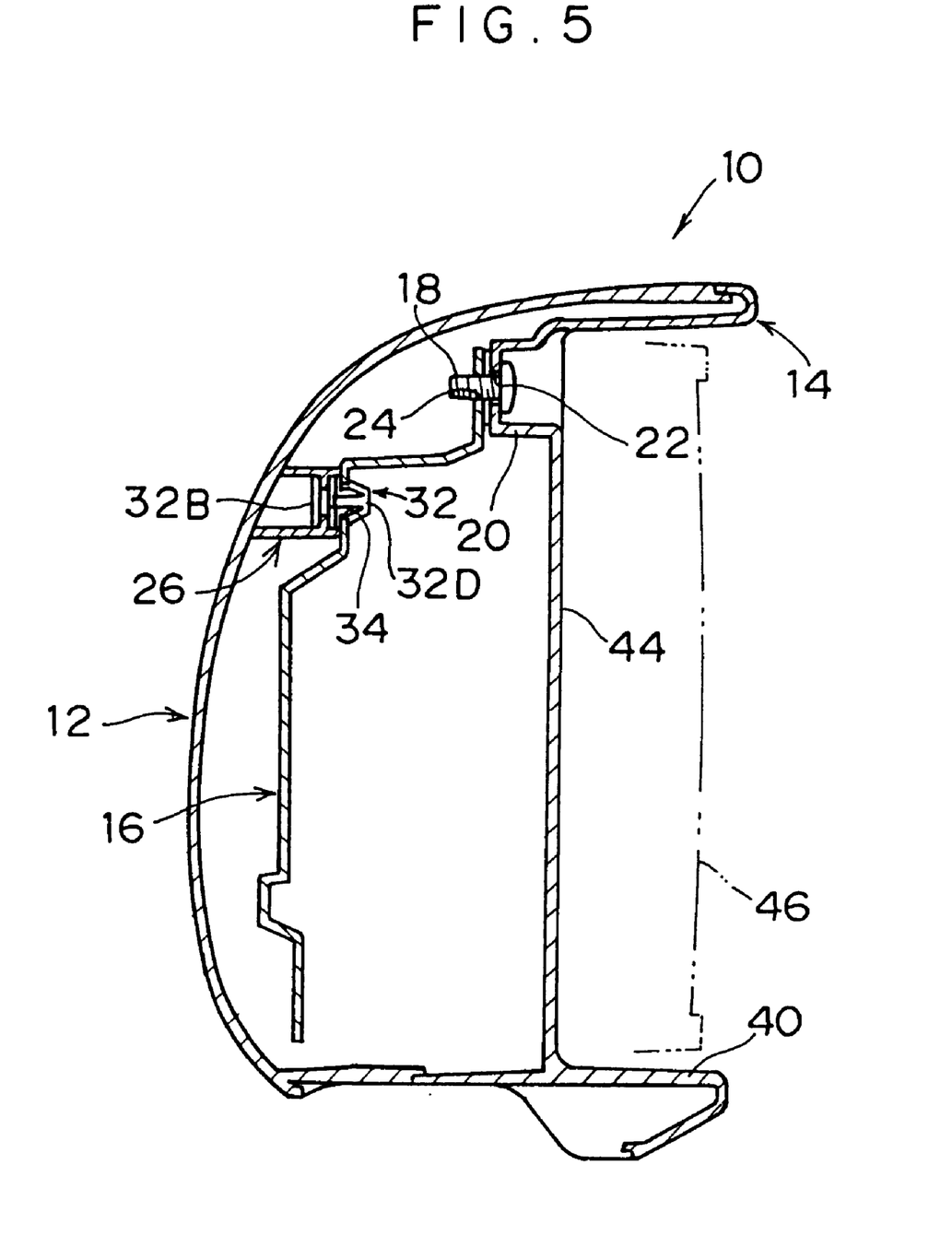
FIG. 5 is a cross-sectional view taken along line 5—5 in FIG. 4, illustrating a longitudinal sectional structure of the door mirror device in FIG. 4.
Figure 6:
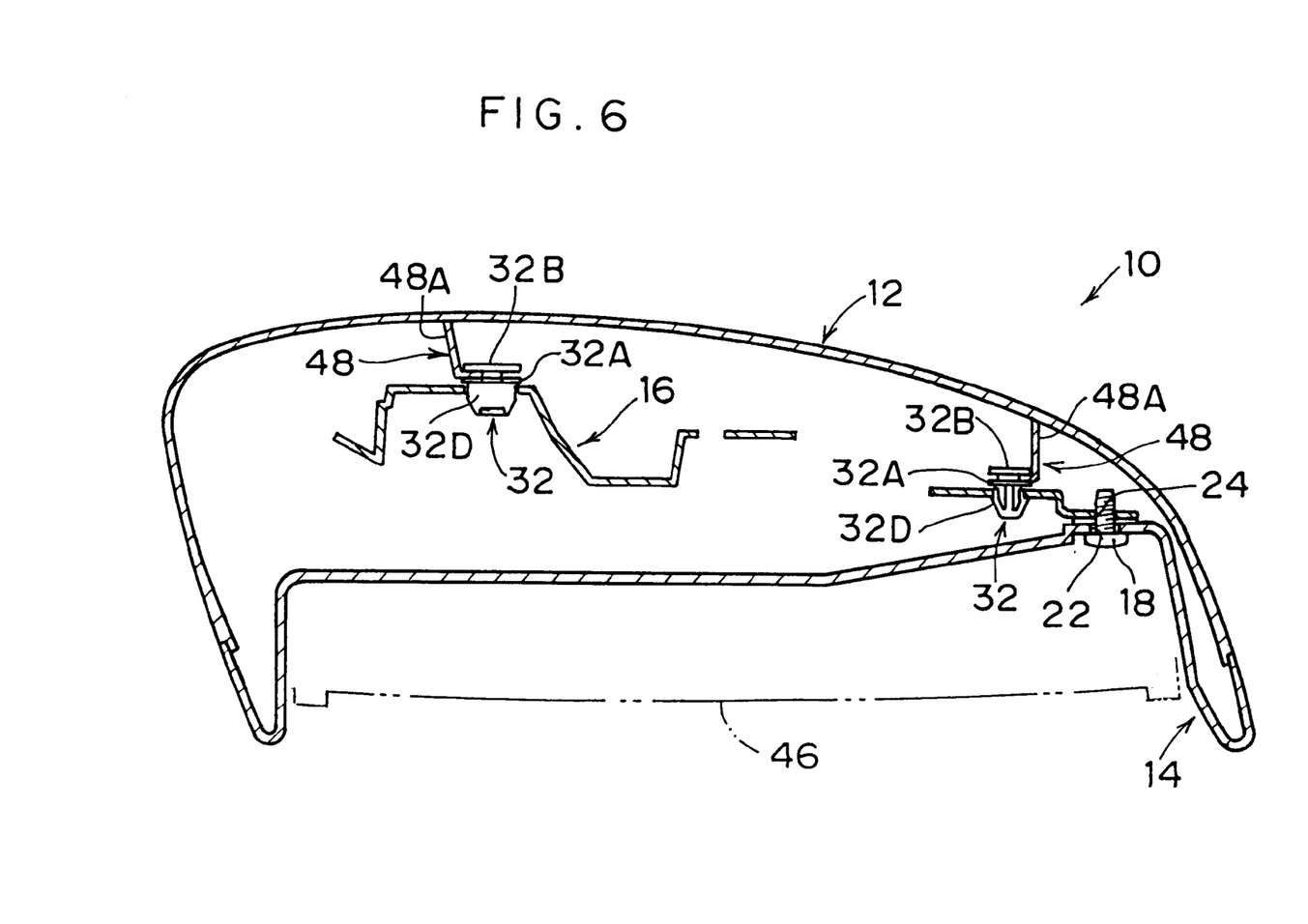
FIG. 6 is a cross-sectional view taken along line 6—6 in FIG. 4, illustrating a transverse sectional structure of the door mirror device in FIG. 4.

A front view of the door mirror device 10 in its assembled state relating to the present embodiment is shown in FIG. 4. FIG. 5 shows a longitudinal sectional structure of the door mirror device 10. FIG. 6 shows a transverse sectional structure of the door mirror device 10.

An overall structure of the door mirror device 10 relating to the second embodiment is shown in each of these figures. A supplementary explanation of the peripheral structures of the door mirror device 10 will be given hereinafter, since description thereof was omitted in the above first embodiment.

The visor cover 12 forming a front outer casing of the device 10 has a curved, substantially box-shaped contour. The visor rim 14 which forms a rear outer casing of the device 10 is structured by a frame 40 that forms an external contour of the visor rim 14 (the design thereof), and a partition wall 44, which is formed inside the frame 40 with a relatively large opening 42 in the middle thereof. A mirror 46 (see FIGS. 5 and 6) for visually confirming the rear field of vision of the vehicle is disposed at the rear side of the partition wall 44 of the visor rim 14. An unillustrated driving section comprising an electrical retracting unit, a mirror driving unit, and the like is mounted to the frame 16. The mirror 46 is connected to the unillustrated mirror driving unit through the opening 42 formed in the partition wall 44.

As shown in FIG. 4, four mounting points (fastening points of the screws 18) at which the visor rim 14 is assembled to the frame 16 are formed at the four corners of the partition wall 44. Four mounting points of the visor cover 12 at which the visor cover 12 is assembled to the frame 16 (engaging points of the clips 32) are formed in the vicinity of the fastening points of the screws 18.

Figure 7:
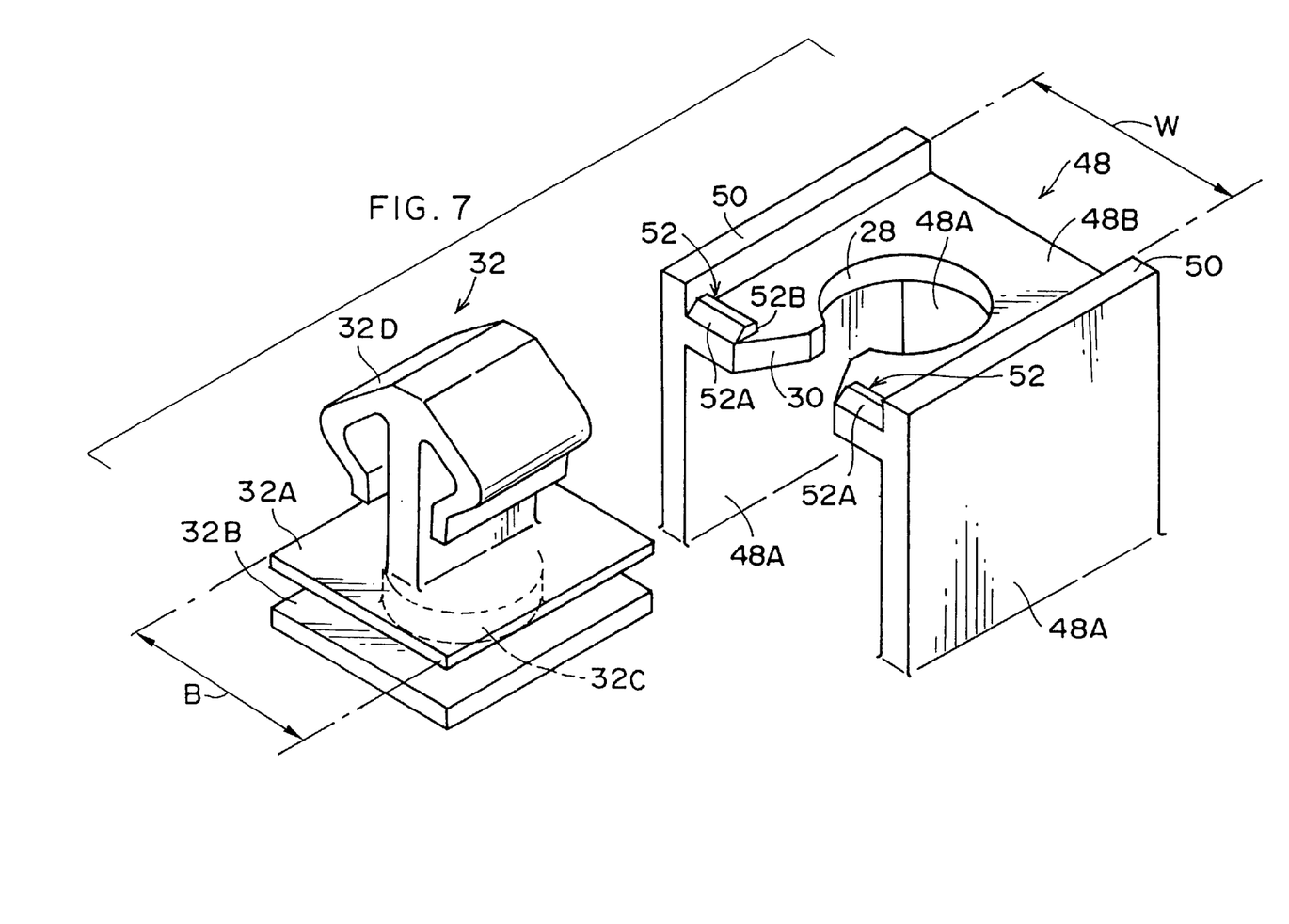
FIG. 7 is an enlarged perspective view illustrating a clip and a seat, which are main portions of the second embodiment of the present invention, in a state in which the clip and the seat have been separated.

The present embodiment is characterized in that a rotation-preventing function and a slip-off preventing function are provided at the seat 48. These functions will be described in detail hereinafter.

As shown in FIG. 7, a seat 48 of the present embodiment has a structure similar to the seat 26 of the first embodiment in that the seat 48 is structured by side walls 48A that together form a substantially U-shaped configuration when seen in planar cross section, and a top wall 48B that joins with upper ends of the side walls 48A. However, in the present embodiment, an elongated rib 50 that serves as a "restricting portion" is integrally formed at the upper surfaces of the two side walls 48A that oppose each other. Thus, the elongated ribs 50 form a pair of ribs which are parallel to one another. A distance W between opposing surfaces of the pair of ribs 50 is substantially equal to a transverse directional dimension B of the upper plate 32A of the clip 32. Further, a stopper 52 is integrally formed at each side of the assembly notch 30 of the top wall 48B to form a pair of stoppers. Each stopper 52 has a tapered surface 52A formed thereon so that a cross section of each stopper 52 has a substantially trapezoidal configuration.

Since the aforementioned structure follows the structure of the main portions of the first embodiment described previously, the same operation and effect of the first embodiment can be achieved with the second embodiment.

In addition, according to the present embodiment, because a pair of ribs 50 is provided at the top wall 48B of the seat 48, when the clip 32 is mounted to the seat 48, side surfaces of the upper plate 32A abut the inner surfaces of the pair of ribs 50. For this reason, after the clip 32 is mounted to the seat 48, the rotation of the clip 32 in the direction in which the claw 32D extends can be prevented. That is, the ribs 50 lock the clip 32. Consequently, misalignment of the claw 32D with respect to the clip-engaging hole 34 formed on the frame 16 due to the orientation (there is directionality in the orientation of the claw 32D of the clip 32 with respect to the clip-engaging hole 34) of the clip 32 being altered by rotation of the clip 32 at the time the visor cover 12 is mounted to the frame 16, such that assembly thereof becomes difficult, can be prevented with the present embodiment. As a result, according to the present embodiment, assembly of the visor cover 12 can be made faster.

To supplement this point, a rotation-preventing function is already secured in the present embodiment by the side surfaces of the plate 32B of the clip 32 abutting against opposing inner surfaces of the side walls 48A of the seat 48 in a state in which the clip 32 has been mounted on the seat 48. Thus, the present embodiment may basically be seen as an example of an embodiment in which a rotation-preventing portion is actively disposed at the upper surface of the top wall 48B of the seat 48. However, there is also another point deserving note in regard to the merit of providing the ribs 50 on the upper surface of the top wall 48B of the seat 48. Namely, with the present embodiment, not only can a rotation-preventing function be obtained with respect to the lower plate 32B of the clip 32, but a further rotation-preventing function can be obtained with respect to the upper plate 32A of the clip 32. This means that rotation of the clip 32 is restricted not only at one longitudinal direction end of the claw 32D, but at the longitudinal direction end of the claw 32D and at a vicinity thereof. Hence, an advantageous effect is obtained with the present embodiment in that twist deformation of the clip 32 resulting from rotation thereof can be suppressed to the greatest extent possible.

Furthermore, in the present embodiment, since the ribs 50 are provided at the upper surface of the top wall 48B of the seat 48, neither is it necessary to form undercuts at the part of the seat 48 in the mold of the visor cover 12, nor is it necessary to give special consideration to removal of the mold. Consequently, according to the present embodiment, the formability of the visor cover 12 is not impaired.

Further, because the stoppers 52 which each have the tapered surface 52A are integrally formed at the sides of the assembly notch 30 in the top wall 48B of the seat 48, the tapered surfaces 52A function as guides when the clip 32 is mounted on the seat 48 in the present embodiment. Thus, assembly of the clip 32 can be improved with the present embodiment. Moreover, because back walls 52B of the stoppers 52 (see FIG. 7) abut against a side surface of the upper plate 32A of the clip 32 after the clip 32 has been mounted to the seat 48, the stoppers 52 function to prevent the clip 32 from slipping. Thus, there is not the nuisance of having to remount the clip 32 on the seat 48 if the clip 32 inadvertently comes off of the seat 48 at the time the visor cover 12 is mounted to the frame 16 once the clip 32 has been mounted to the seat 48. As a result, assembly of the visor cover can be improved with the present embodiment.

Although a case in which the visor cover 12 is held by the frame 16 is described in the above embodiments, the present invention is not limited to the same. For example, the present invention may be applied to the visor rim 14 or to both the visor cover 12 and the visor rim 14.

That is, in a case in which the seat 26 is formed integrally with the visor cover 12 and a separate clip 32 is attached to the seat 26 as in the above embodiments, the visor cover 12 is assembled to the frame 16 or the visor rim 14 via the clip 32. Alternatively, in a case in which the seat 26 is formed integrally with the visor rim 14 and a separate clip 32 is attached to the seat 26, the visor rim 14 is assembled to the frame 16 or the visor cover 12. Further, when the visor cover 12 and the visor rim 14 are both formed integrally with the seat 26 and a separate clip 32 is mounted to each, the visor cover 12 and the visor rim 14 are assembled to the frame 16.

Although a case in which the frame 16 is disposed between the visor cover 12 and the visor rim 14 is described in the above embodiments, the frame 16 may be omitted.

In the second embodiment described above, the ribs 50 are formed as "restricting portions" at the top wall 48B of the seat 48. However, the present invention is not limited to the same, and examples of the restricting portions include various structures. For instance, as described in conjunction with the second embodiment, the pair of side walls 48A that are abutted by side surfaces of the lower plate 32B of the clip 32 is also a kind of restricting portion. Further, a rib formed at the back side of the upper surface of the top wall 48B (i.e., opposite the pair of stoppers 52) may also serve as a restricting portion, since the upper plate 32A of the clip 32 is restricted from rotating by the rib and the stoppers 52. Moreover, the clip 32 can also be prevented from rotating by, for example, forming at an outer periphery of the mounting portion 32C of the clip 32 one or more protrusions that protrude outward in a radial direction and forming in an inner peripheral surface of the clip-insertion hole 28 of the seat 26 or the seat 48 a slit into which the protrusion can be inserted, so that the protrusion may fit into the slit when the clip 32 is mounted on the seat 26 or the seat 48.

Although the resin clip 32 is used in the above embodiments, a material other than metal may also be used for the clip as long as quality and effects which are the same as those of the clip 32 are obtained.

As described above, a structure for holding a visor for a door mirror device, which structure has the excellent effect of being able to obtain sufficient holding power over a long period of time, can be obtained with the present invention.

What is claimed is:

1. A structure for holding a visor for a door mirror device, the structure including a resin visor cover that forms a front outer casing of the device and a resin visor rim that forms a rear outer casing of the device and connects to the visor cover, and for holding at least one of the visor cover and the visor rim, the structure comprising:

a seat provided at an inner side of at least one of the visor cover and the visor rim; and a clip that is formed separately from the seat, is mounted to the seat, and elastically engages with one of the visor cover, the visor rim, and a frame disposed between the visor cover and the visor rim.

2. The structure for holding a visor for a door mirror device according to claim 1, wherein:

the seat has a top wall in which a clip-engaging hole and an assembly notch that communicates with the clip-engaging hole are formed; and the clip has a pair of plates that nip the top wall in a state in which the clip is mounted in the clip-engaging hole.

3. The structure for holding a visor for a door mirror device according to claim 2, wherein the seat has a hollow, substantially cubic configuration and is structured by side walls that together form a substantially U-shaped configuration when seen in planar cross section and the top wall that joins the upper ends of the side walls.

4. The structure for holding a visor for a door mirror device according to claim 2, wherein a distance between the pair of plates of the clip is set to be substantially equal a thickness of the top wall of the seat.

5. The structure for holding a visor for a door mirror device according to claim 2, wherein the clip has a mounting portion that connects the pair of plates at a center of the plates.

6. The structure for holding a visor for a door mirror device according to claim 5, wherein the mounting portion has an outer diameter substantially corresponding with an inner diameter of the clip-engaging hole formed in the top wall.

7. The structure for holding a visor for a door mirror device according to claim 6, wherein the clip further comprises an elastically deformable claw having a substantially T-shaped configuration when seen in side view.

8. The structure for holding a visor for a door mirror device according to claim 7, wherein the clip is formed by a material having excellent heat resistance and resistance to cracks caused by impregnation of a solvent.

9. The structure for holding a visor for a door mirror device according to claim 8, wherein the claw of the clip may be elastically-contracted only in a fixed direction.

10. The structure for holding a visor for a door mirror device according to claim 1, wherein a restricting portion that serves as a rotation-preventing function to the clip when the clip is mounted on the seat is provided on at least one of the seat and the clip.

11. The structure for holding a visor for a door mirror device according to claim 2, wherein a restricting portion that serves as a rotation-preventing function to the clip when the clip is mounted on the seat is provided on at least one of the seat and the clip.

12. The structure for holding a visor for a door mirror device according to claim 2, wherein a restricting portion that serves as a rotation-preventing function to the clip is provided at the top wall of the seat, with the restricting portion abutting sides of the plate that makes contact with an upper surface of the top wall in a state in which the clip is mounted in the clip-engaging hole.

13. The structure for holding a visor for a door mirror device according to claim 2, wherein a stopper for preventing the clip from becoming dismounted from the seat is provided at each side of the assembly notch in the top wall of the seat.

14. The structure for holding a visor for a door mirror device according to claim 12, wherein a stopper for preventing the clip from becoming dismounted from the seat is provided at each side of the assembly notch in the top wall of the seat.

15. The structure for holding a visor for a door mirror device according to claim 14, wherein the restricting portion is a pair of ribs formed parallel to each other at sides of the upper surface of the top wall.

16. The structure for holding a visor for a door mirror device according to claim 15, wherein a distance between opposing inner surfaces of the pair of ribs is substantially equal to a transverse direction dimension of the upper plate of the clip.

17. The structure for holding a visor for a door mirror device according to claim 13, wherein a cross section of the stopper has a substantially trapezoidal configuration and the stopper has a tapered surface to serve as a guide when the clip is mounted to the seat.

18. The structure for holding a visor for a door mirror device according to claim 16, wherein a cross section of the stopper has a substantially trapezoidal configuration and the stopper has a tapered surface to serve as a guide when the clip is mounted to the seat.

* * * * *